United States Patent [19]
Murphy

[11] Patent Number: 5,799,985
[45] Date of Patent: Sep. 1, 1998

[54] TUBE TESTING CONNECTOR

[75] Inventor: Kevin Murphy, Schaumburg, Ill.

[73] Assignee: Tuthill Corporation, Hinsdale, Ill.

[21] Appl. No.: 698,005

[22] Filed: Aug. 13, 1996

[51] Int. Cl.$^6$ ............................................. F16L 35/00
[52] U.S. Cl. ..................... 285/38; 285/101; 285/102; 285/340
[58] Field of Search ................... 285/340, 101, 285/102, 104, 105, 106, 108, 38; 73/49.1, 49.5

[56] References Cited

U.S. PATENT DOCUMENTS

| | | | |
|---|---|---|---|
| 3,323,551 | 6/1967 | Bell et al. | 138/90 |
| 3,425,717 | 2/1969 | Bruce | 285/340 X |
| 3,499,469 | 3/1970 | Vizuete et al. | 138/90 |
| 3,525,365 | 8/1970 | Meulendyk et al. | 138/89 |
| 3,727,952 | 4/1973 | Richardson | 285/101 |
| 3,857,414 | 12/1974 | Richardson et al. | 138/90 |
| 4,282,982 | 8/1981 | Nuesslein | 220/237 |
| 4,326,407 | 4/1982 | Van Meter | 285/102 X |
| 4,625,765 | 12/1986 | O'Donnell et al. | 138/89 |
| 4,759,572 | 7/1988 | Richardson | 285/101 |
| 5,181,543 | 1/1993 | Hendzel | 138/90 |
| 5,439,258 | 8/1995 | Yates | 285/340 X |

FOREIGN PATENT DOCUMENTS 2140116  11/1984  United Kingdom ................ 285/101

*Primary Examiner*—Dave W. Arola
*Attorney, Agent, or Firm*—Lee, Mann, Smith McWilliams, Sweeney & Ohlson

[57] ABSTRACT

A tube testing connector adapted to engage a tube for pressurization thereof including a hollow body defining an entrance aperture at one end thereof for insertion of a tube to be tested and a pressure aperture defined in an end cap positioned at the other end of the body in sealing engagement with the body. The tester further includes a chamber having disposed therein retention gripping means to initially grip the inserted tube prior to pressurization. The connector operates such that when the tube is pressurized, the components of the tube testing connector exert an increased gripping force on the outer diameter of the tube to be tested so as to secure it in place during the test procedure.

10 Claims, 2 Drawing Sheets

TUBE TESTING CONNECTOR

BACKGROUND OF THE INVENTION

The present invention pertains to a device generally referred to in the art as a tube testing connector. Devices of this type are utilized to connect thin wall conduit, tubes, or the like, such as found in refrigeration apparatus, to high-pressure test equipment for testing of the tubing assembly before it is put into service. The connector can also be used as a filling connector to initially pressurize the apparatus with freon or some other refrigerant. In the pretesting of such equipment on an assembly-line basis or where equipment is already installed, it is necessary to be able to connect equipment to the testing apparatus quickly and easily. There are numerous devices of this general type. However prior art devices do not have the capability to increase gripping engagement of the tube when it is pressurized. This is an important benefit when dealing with very high pressure testing. Without increased retention of tubing and increased sealing effectiveness with increased pressures, effective and accurate testing is difficult and there exists the possibility that the tube may be forced out of the test connector under high pressure.

SUMMARY OF THE INVENTION

This invention relates to a self-sealing tube testing connector used in pressure testing of tubes. It comprises, in combination, a hollow body defining an entrance aperture at one end thereof for insertion of a tube to be tested, a pressure aperture defined in an end cap positioned at the other end of the body in sealing engagement with the body, a chamber retention gripping means disposed in the cylinder, an actuating ring slidably positioned within the cylinder, adapted to engage the gripping means, a sleeve member provided with resilient biasing means on either side of a sleeve head to provide initial gripping engagement of the tube prior to pressurization, the connector operates such that when the tube is pressurized the components exert an increased gripping force on the outer diameter of the tube to be tested so as to secure it in place during the test procedure.

DETAILED DESCRIPTION OF THE PREFERRED EMBODIMENT

Figure 1:
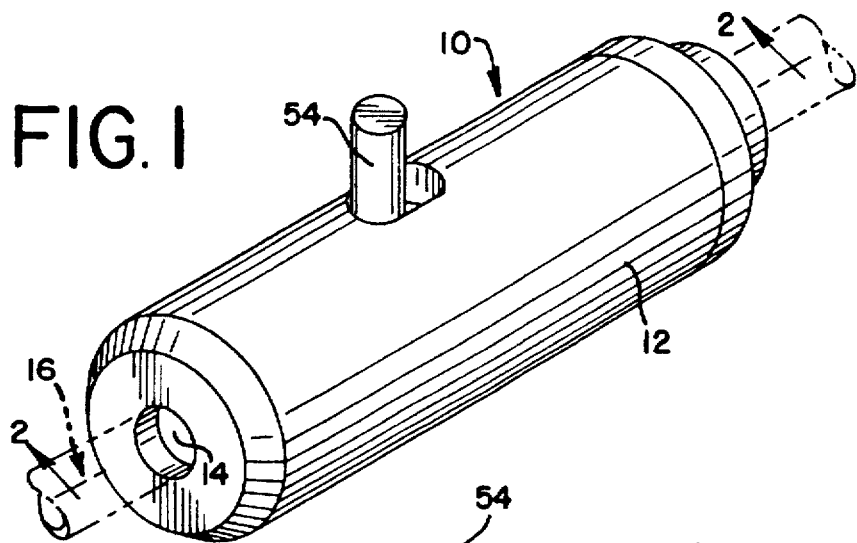
FIG. 1 is a perspective view of the circumferential retention connector embodying the present invention.
Figure 2:
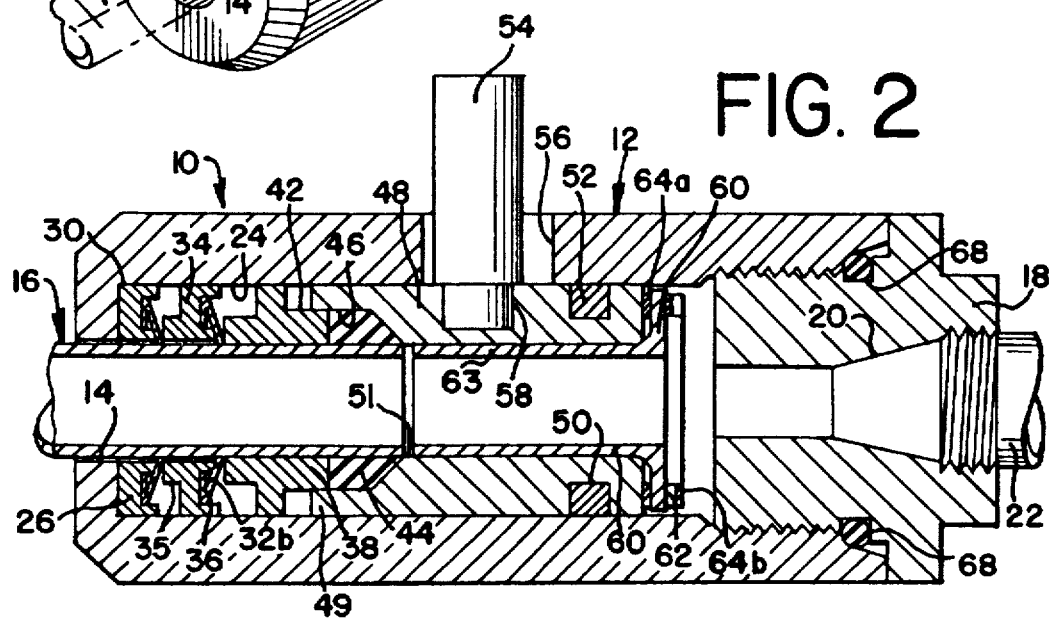
FIG. 2 is a sectional view, taken along the lines 2—2 shown in FIG. 1, of the circumferential retention connector having a tube inserted in a fully pressurized position.
Figure 3:
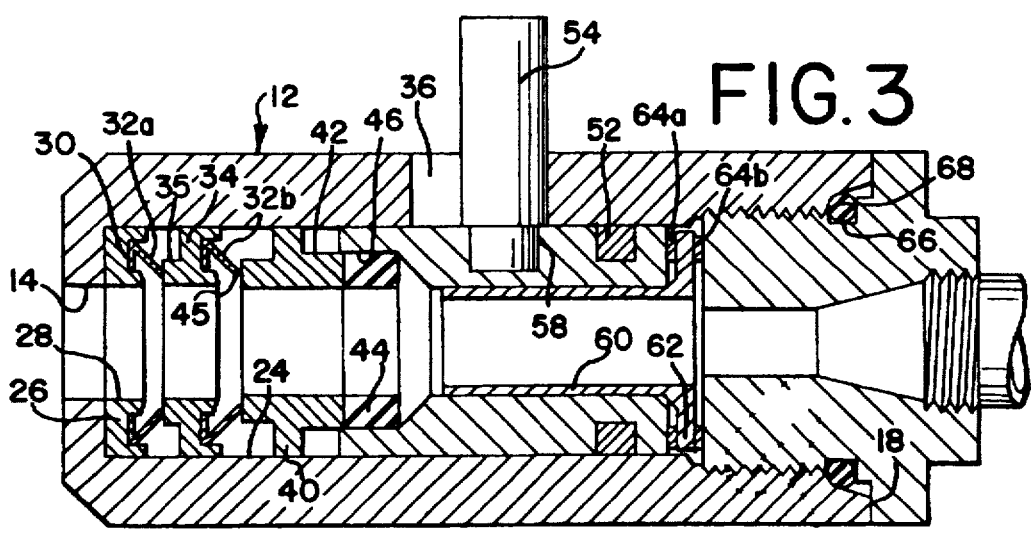
FIG. 3 is a sectional view of the circumferential retention connector in a non-pressurized position with the tube removed.
Figure 8:
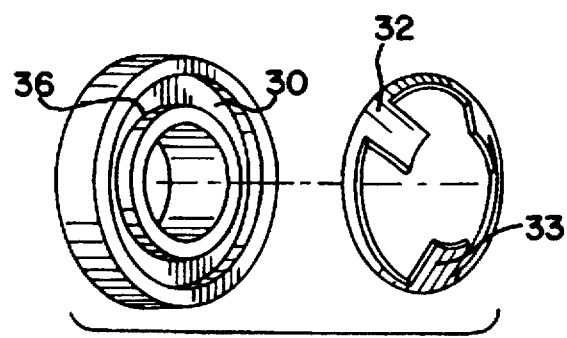
FIG. 8 is an exploded perspective view of a beveled washer and corresponding ring.

FIG. 1 illustrates the exterior of an assembled tube testing connector 10. As shown in FIGS. 2 and 3 the connector 10 comprises a hollow body 12 with an entrance aperture 14 at one end adapted to receive a tube 16 to be tested and an end cap 18 at the other end. The end cap 18 includes a threaded pressure aperture 20 into which a conduit 22 is threadably secured. In the preferred embodiment the aperture 20 will include a National Pipe Thread (NPT) taper which is preferred for pressure connections. The conduit 22 is connected to a source of pressurized fluid (not shown) used for testing. The body 12 defines a central chamber 24 therein. Located within the chamber 24, adjacent the entrance aperture 14, is a face ring 26. The face ring is preferably cylindrical and includes a central aperture 28, best illustrated in FIG. 3, through which the tube 16 may pass, as shown in FIG. 2. The face ring 26 has an annular groove 30 therein as seen in FIG. 8. Circumferential retention gripping means, illustrated as a beveled spring washer 32a, is mounted in groove 30. Located adjacent the beveled washer 32a within the chamber 24 is a spacer ring 34, similar in construction to face ring 26. However, the spacer ring 34 includes a laterally extending spacer portion 35, which is not present on face ring 26, and a round groove 36 for mounting a second beveled spring washer 32b therein. In certain instances it may be preferable to use two spacer rings 34 instead of a face ring 26 and a spacer ring 34. Such an arrangement will produce similar results but will reduce the number of different parts which need to be kept in inventory. Each of the beveled spring washers 32a and 32b include projecting resilient prongs 33, best shown in FIG. 8. Located adjacent the beveled washer 32b is actuator means illustrated as an actuator ring 38 having an upstanding ridge 40 extending around its outside surface, of slightly smaller diameter than the internal diameter of the chamber 24. The actuator ring 38 includes a first end face 42 adapted to engage a seal member 44 and a second opposite end face 45 adapted to engage the prongs 33 of bevelled washer 32b. The first end face 42 has the same inner and outer diameter as the seal 44. As shown in FIG. 2, the seal 44 is positioned inside a seal chamber 46 defined internal to one end of a piston 48 which is slidably located inside chamber 24 adjacent the actuator ring 40. The piston includes an actuating end 49 located adjacent the ridge 40 which encircles a portion of the first end face 42 of the actuator ring 40. The piston also defines a central aperture 51 extending therethrough. The piston 48 defines a groove 50 extending around its outer perimeter. An O-ring 52 or a quad-ring of known construction may be positioned within the groove 50 to provide a fluid seal as the piston slides within and along the chamber 24. A release pin 54 extends through a slot 56 defined in the body 12 and is screwed into a threaded hole 58 located in the piston 48 to provide for selective manual movement of the piston when desired.

A hollow sleeve member 60 is provided having a sleeve head 62 of annular configuration disposed between the piston 48 and cap 18. The sleeve member 60 also includes a shaft 63 which is slidably disposed within the central aperture 51 of the piston. A pair of wave springs 64 are positioned within the chamber 24, one located on either side of the sleeve head 62. A first wave spring 64a is located between the piston 48 and the sleeve head 62. A second identical wave spring 64b is located adjacent sleeve head 62, on the side of the sleeve head opposite the first wave spring, between the sleeve head 62 and the inner end of the end cap 18. The wave springs, in cooperation with the sleeve and the piston, cooperate to provide an initial gripping engagement of the tube to be tested prior to pressurization of the connector. The end cap 18 is threaded into the end of the connector body 12. The end cap includes a groove 66 therein for mounting a seal 68 therein. The seal 68 fits between the end cap 18 and the connector body 12 to create a fluid tight seal.

In operation, the tube 16 to be tested is inserted into the end wall entrance aperture 14 as shown in FIG. 2 until the tube contacts the shaft 63 of sleeve member 60, driving it slightly to the right, thereby compressing the wave spring 64b. The prongs 33 of washers 32a and 32b initially engage the outer circumference of the tube 16 to oppose withdrawal of the tube 16 from the entrance aperture 14. When the tube is released, the spring 64b urges the sleeve 60 to move to the left, thereby compressing spring 64a and urging the piston 48 to move to the left from the position shown in FIG. 3 partially forward the position shown in FIG. 2. As the piston 48 moves to the left it carries with it seal 44 which engages the seal end 42 of actuator ring 38, thereby also forcing actuator ring 38 to move to the left. As ring 38 moves it engages bevelled washer 32b and compresses it from the position shown in FIG. 3 toward the position shown in FIG. 2. Simultaneously spacer ring 34 moves to the left with the spacer portion 35 engaging the tip of bevelled washer 32a and compressing it from the position shown in FIG. 3 toward the position shown in FIG. 2. The movement of the piston and actuator substantially stops when the prongs 33 of washers 32a and 32b contact the tube surface, producing a positive retention force against withdrawal from the connector.

Next, the connector 10 is pressurized through conduit 22. The piston 48 is forced to move slightly further to the left as shown in FIG. 2, and the gripping force exerted by the bevelled washers 32a and 32b on the tube increases. As both beveled washers 32a and 32b are compressed, the beveled portions or prongs 33 are forced further into a retentive gripping position around the outside surface of the inserted tube 16 to be tested.

After testing is complete, line pressure in conduit 22 is relieved, thereby reducing the force against the piston 48. The release pin 54 is manually moved to the right from the position shown in FIG. 2 to the position shown in FIG. 3. This returns all of the associated parts to their FIG. 3 position and releases the prongs 33 of bevelled washers 32a and 32b from any engagement with the tube 16 that was tested. This facilitates removal of the tube from the tube testing connector.

The preferred embodiment of the invention uses two beveled washers 32a and 32b and two associated ring members. As described previously the angled prongs 33 of beveled washers 32a and 32b are forced toward a more vertical and gripping position as increased pressure pushes the actuation ring 42 axially within the chamber 24 against the ends of the washer prongs 32a and 32b.

Figure 4:
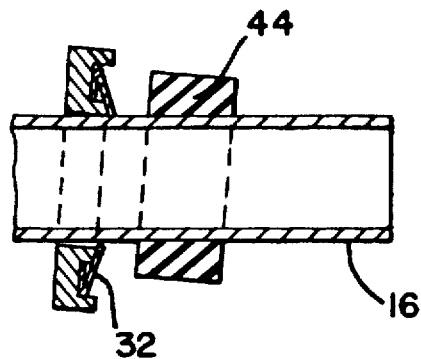
FIG. 4 is a side view, in section, of a face ring having a beveled washer therein and a seal mounted on a tube to be tested.
Figure 5:
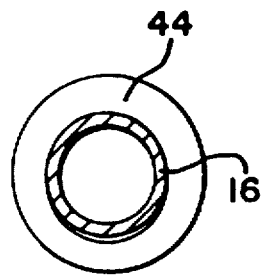
FIG. 5 is an end view of the arrangement shown in FIG. 4.
Figure 6:
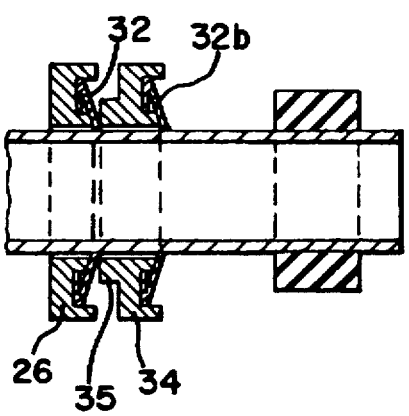
FIG. 6 is a side view, in section, of a face ring and a spacer ring having beveled washers in each ring and a seal mounted on a tube to be tested.
Figure 7:
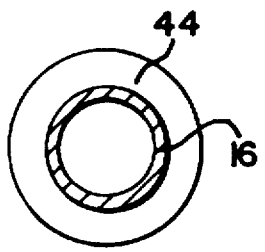
FIG. 7 is an end view of the tube arrangement shown in FIG. 6.

As illustrated in FIGS. 4 and 5, when only using one beveled washer 32a and one ring 26, the weight of the connector 10 may cause compression on the top half of the seal 44, while separating the seal 44 from the tube 16 on the bottom half of the seal 44. When pressurized, the top half of the seal 44 compresses first and therefore no uniform seal is produced. Conversely, as seen in FIGS. 6 and 7, by using at least two beveled washers 32a and 32b, both beveled washers grasp the outside diameter of the tube 16 thereby centering the tube 16 with the connector 10 and seal 44. As the connector 10 is pressurized, the actuating ring 42 compresses the seal 44 in a uniform manner thereby, creating a more uniform and effective seal. Thus the preferred embodiment of the invention contemplates the use of multiple bevelled washers 32 and multiple rings carrying them.

Various features of the invention have been particularly shown and described in connection with the illustrated embodiments of the invention, however, it must be understood that these particular arrangements merely illustrate and that the invention is to be given its fullest interpretation within the terms of the appended claims.

What is claimed is:

1. A tube testing connector adapted to engage a tube for pressurization thereof and adapted to be connected to a pressure source said connector including:

a hollow body member defining an entrance aperture at one end thereof and an opposite end, said entrance aperture adapted to receive the tube to be tested;

a central chamber defined within said hollow body member an end cap secured at said opposite end of said hollow body member said end cap defining a pressure aperture adapted to communicate with the pressure source;

a first ring member slidably disposed in said central chamber, adjacent said entrance aperture, said first ring member having a central aperture adapted to receive the tube therethrough;

first circumferential retention gripping means, including a first resilient biasing member, associated with said first ring member, said first resilient biasing member defining an opening therethrough and adapted to surround the tube for gripping engagement therewith;

actuator means slidably disposed within said central chamber adjacent said first ring member and adapted to surround the tube;

a piston slidably disposed within said central chamber, said piston having an actuator engaging end and another end, said actuator engaging end adapted to engage said actuator means;

a central aperture defined within said piston;

a first spring member disposed between said piston and said end cap;

first seal means disposed between said piston and said hollow body member to prevent the flow of fluid pressure therebetween;

second seal means disposed within said central chamber and adapted to surround the tube;

said connector operative such that, when the tube to be tested is inserted into said hollow body member through said entrance aperture, said first ring member and said first resilient biasing member, said first spring member is axially compressed by the insertion of the tube and upon release of the tube said first spring is free to axially displace said piston and said actuator means toward said entrance aperture, thereby reducing the diameter of said opening of said first resilient biasing member so as to exert a gripping force on the outer diameter of the tube to be tested, thereby securing it in place during the testing procedure.

2. A tube testing connector in accordance with claim 1 including a second ring member slidably disposed within said central chamber and positioned between said first ring member and said actuator means.

3. A tube testing connector in accordance with claim 2 wherein said second ring member includes a spacer face portion extending laterally therefrom and positioned so as to engage and activate said first circumferential retention gripping means.

4. A tube testing connector in accordance with claim 2 further including a second circumferential retention gripping means associated with said second ring member, said second circumferential retention gripping means including a second resilient biasing member.

5. A tube testing connector in accordance with claim 4 wherein said first and second resilient biasing members are beveled spring washers.

6. A tube testing connector in accordance with claim 1 wherein said first resilient biasing member is a beveled spring washer with at least one projecting resilient prong.

7. A tube testing connector in accordance with claim 1 including a sleeve member having a shaft which is slidably disposed within said central aperture of said piston, and a head extending from said shaft and disposed between said other end of said piston and said end cap, said shaft of said sleeve member adapted to be engaged by the tube to be tested.

8. A tube testing connector in accordance with claim 7 including a second spring member, wherein said first spring member is disposed on one side of said head and said second spring member is disposed on the other side of said head, said sleeve member and said spring members operative to provide initial engagement of the tube by said first and second circumferential retention gripping means prior to pressurization of said connector.

9. A tube testing connector in accordance with claim 1 wherein said actuator means includes an actuator ring slidably disposed within said central chamber, said actuator ring including a first end face adapted to engage second seal means and a second opposite end face adapted to engage said first circumferential retention gripping means.

10. A tube testing connector in accordance with claim 1 including a slot defined in said hollow body member and a release pin extending through said slot and connected to said piston, whereby said release pin is operative for manual movement of said piston.

* * * * *